United States Patent
Grisenthwaite et al.

(10) Patent No.: US 7,024,543 B2
(45) Date of Patent: Apr. 4, 2006

(54) SYNCHRONISING PIPELINES IN A DATA PROCESSING APPARATUS

(75) Inventors: Richard Roy Grisenthwaite, Guilden Morden (GB); Ian Victor Devereux, Fulbourn (GB)

(73) Assignee: ARM Limited, Cambridge (GB)

( * ) Notice: Subject to any disclaimer, the term of this patent is extended or adjusted under 35 U.S.C. 154(b) by 489 days.

(21) Appl. No.: 10/242,671

(22) Filed: Sep. 13, 2002

(65) Prior Publication Data

US 2004/0054876 A1    Mar. 18, 2004

(51) Int. Cl.
G06F 9/38 (2006.01)
G06F 9/52 (2006.01)

(52) U.S. Cl. ........................ 712/219; 712/244
(58) Field of Classification Search ............... 712/217, 712/219, 244; 714/38; 711/219; 713/502
See application file for complete search history.

(56) References Cited

U.S. PATENT DOCUMENTS

| 5,530,825 | A  | * | 6/1996  | Black et al. ................. 711/213 |
| 6,496,925 | B1 | * | 12/2002 | Rodgers et al. ............. 712/244 |
| 6,553,480 | B1 | * | 4/2003  | Cheong et al. ............... 712/23 |
| 6,553,512 | B1 | * | 4/2003  | Gibson ........................ 714/17 |
| 6,751,717 | B1 | * | 6/2004  | Johnson ...................... 711/167 |

* cited by examiner

Primary Examiner—Daniel H. Pan
(74) Attorney, Agent, or Firm—Nixon & Vanderhye P.C.

(57) ABSTRACT

The present invention provides an apparatus and method for synchronizing a first pipeline and a second pipeline of a processor arranged to execute a sequence of instructions. The processor is arranged to route an instruction in the sequence through either the first or the second pipeline dependent on predetermined criteria, each pipeline having a plurality of pipeline stages including a retirement stage. Counter logic is provided for maintaining a first counter relating to the first pipeline and a second counter relating to the second pipeline. For each instruction in the first pipeline a determination is made as to when that instruction reaches a point within the first pipeline where an exception status of that instruction is resolved, and the counter logic is arranged to increment the first counter responsive to such determination. The processor is arranged to generate an indication within the second pipeline each time an instruction is routed to the first pipeline, and the counter logic is further arranged to increment the second counter responsive to that indication. Synchronisation logic is then provided which is arranged, when an instruction is in the retirement stage of the second pipeline, to determine with reference to the values of the first and second counters whether that instruction can be retired. If so, the retirement stage is arranged to cause an update of a state of the data processing apparatus dependent on the result of execution of that instruction.

33 Claims, 5 Drawing Sheets

| Examples Ld > Ret | | | | | | | |
|---|---|---|---|---|---|---|---|
| Retirement Counter (Ret) | 000 | 011 | 111 | 000 | 001 | 001 | 100 |
| Load Counter (Ld) | 001 | 100 | 000 | 011 | 100 | 110 | 000 |
| Computation by Adder 330 | 000 −110 \| 111₁ | 011 −011 \| 111₁ | 111 −111 \| 111₁ | 000 −100 \| 101₁ | 001 −011 \| 101₁ | 001 −001 \| 101₁ | 100 −000 \| 101₁ |

FIG. 5A

| Examples !(Ld > Ret) | | | | | | | |
|---|---|---|---|---|---|---|---|
| Retirement Counter (Ret) | 001 | 100 | 000 | 011 | 100 | 100 | 000 |
| Load Counter (Ld) | 000 | 011 | 111 | 000 | 001 | 110 | 101 |
| Computation by Adder 330 | 001 −111 \| 001 | 100 −100 \| 001 | 000 −000 \| 001 | 011 −111 \| 011 | 100 −110 \| 011 | 100 −110 \| 011 | 000 −010 \| 011 |

FIG. 5B

SYNCHRONISING PIPELINES IN A DATA PROCESSING APPARATUS

BACKGROUND OF THE INVENTION

1. Field of the Invention

The present invention relates to the synchronisation of pipelines in a data processing apparatus, and more particularly to an apparatus and method for synchronising a first pipeline and a second pipeline of a processor arranged to execute a sequence of instructions.

2. Description of the Prior Art

Pipelined processors are used to enable multiple instructions to be in the process of being executed at the same time. Rather than having to wait until the execution of one instruction has fully completed before providing the next instruction to the processor, a pipelined processor is able to receive new instructions into the pipeline whilst other instructions are still in the process of being executed at subsequent pipeline stages of the pipeline, thereby significantly improving the performance.

To further seek to improve the performance of pipelined processors, it is known to provide a processor with multiple pipelines rather than just a single pipeline. As an example, a pipeline may be provided for dealing with load and store instructions, whilst a different pipeline may be provided for dealing with arithmetic instructions. Typically, the first part of each pipeline is unified such that there is a common pipeline for the earlier stages of instruction execution, such as decode and issue stages.

With processors that have multiple pipelines, one problem that can occur is that of synchronisation between the instructions in the multiple pipelines. A final stage in each pipeline typically takes the form of a retirement stage, during which the state of the data processing apparatus is updated dependent on the result of the execution of the instruction that is then in that retirement stage. It will be appreciated that an instruction that has been routed into one of the pipelines may move through that pipeline at a different rate to an instruction that has been routed into a second of the pipelines since, for example, stall cycles may need to be introduced into one of the pipelines to allow one or more instructions in that pipeline to be executed correctly. The result of this is that instructions will not necessary reach the retirement stage of their respective pipelines in their original ordering within the instruction sequence. As an example, if a load instruction is followed by an add instruction in the original instruction sequence, it is possible that the add instruction may reach the retirement stage of its pipeline before the load instruction reaches the retirement stage of its pipeline.

Whilst many data processing apparatus allow out or order retirement of instructions, and hence can accommodate such scenarios, it is however important to know when retiring an instruction that any preceding instruction in the instruction sequence that may not yet have been retired will not give rise to an exception. This is due to the fact that if an earlier instruction were to give rise to an exception, this would typically indicate that the later instructions should not be executed, and accordingly it would be important that none of those later instructions were retired.

One way to deal with this problem is to ensure that the instructions remain within a unified pipeline until a point is reached where the exception status of each instruction has been resolved. Hence, the instructions remain in order until the exception status has been resolved, and only thereafter are allowed to be spilt into multiple pipelines to seek to improve processing performance.

However, it has been found that such an approach limits the performance benefit to be gained from using multiple pipelines, due to the need to wait for the exception status to be resolved before any particular instruction can be routed into one of the multiple pipelines. This results in the resolving of the exception status of each instruction becoming a critical path within the processor, ultimately limiting the speed at which the processor can be run.

Accordingly, it would be desirable to allow instructions to be passed into one of the multiple pipelines before the exception status had been resolved. However, as discussed earlier, this then gives rise to the problem of synchronisation between the pipelines, since even where out of order retirement is allowed, it is still appropriate to determine prior to retiring an instruction that no preceding instructions in the sequence may give rise to an exception.

Accordingly, it is an object of the present invention to provide a technique for synchronisation between multiple pipelines that alleviates the above described problem.

SUMMARY OF THE INVENTION

Viewed from a first aspect, the present invention provides a data processing apparatus comprising: a processor operable to execute a sequence of instructions, the processor having a first pipeline and a second pipeline, the processor being arranged to route an instruction in the sequence through either the first or the second pipeline dependent on predetermined criteria, each pipeline having a plurality of pipeline stages including a retirement stage; counter logic operable to maintain a first counter relating to the first pipeline and a second counter relating to the second pipeline, for each instruction in the first pipeline a determination being made as to when that instruction reaches a point within the first pipeline where an exception status of that instruction is resolved, and the counter logic being arranged to increment the first counter responsive to said determination, the processor being arranged to generate an indication within the second pipeline each time an instruction is routed to the first pipeline, and the counter logic being arranged to increment the second counter responsive to said indication; and synchronisation logic arranged, when an instruction is in the retirement stage of the second pipeline, to determine with reference to the values of the first and second counters whether that instruction can be retired, and if so the retirement stage being arranged to cause an update of a state of the data processing apparatus dependent on the result of execution of that instruction.

In accordance with the present invention counter logic is provided for maintaining a first counter relating to the first pipeline and a second counter relating to the second pipeline. Then, when an instruction reaches the retirement stage of the second pipeline, synchronisation logic is used to determine with reference to the values of the first and second counters whether the instruction can be retired.

For each instruction in the first pipeline, a determination is made as to when that instruction reaches a point where an exception status of that instruction is resolved, and the counter logic is arranged to increment the first counter responsive to that determination. As will be discussed in more detail later, the actual time at which the first counter is incremented following such determination may be varied depending on the implementation.

With regards to the second counter, the processor is arranged to generate an indication within the second pipeline each time an instruction is routed to the first pipeline, and the counter logic is arranged to increment the second counter responsive to the indication. Again, the actual time at which the second counter is incremented following such an indication can be varied, dependent on the implementation.

By providing these two counters, it has been found that the synchronisation logic is then in a position to determine, when an instruction is in the retirement stage of the second pipeline, whether any preceding instructions in the instruction sequence that are being handled by the first pipeline are still able to give rise to an exception, and accordingly is able to determine whether the instruction at the retirement stage of the second pipeline can or cannot be retired at that time.

It has been found that this technique provides a particularly simple and efficient technique for synchronising the first and second pipelines, enabling instructions to be routed into those pipelines before their exception status has been resolved, whilst still ensuring that no instructions are retired until it is clear that any preceding instructions in the sequence can no longer give rise to an exception.

It will be appreciated that there are many different ways in which the indication generated within the second pipeline each time an instruction is routed to the first pipeline can be embodied. For example, the indication may take the form of some count value or flag passed through the second pipeline in association with the next instruction to be issued into the second pipeline following the instruction routed into the first pipeline. However, in preferred embodiments, the indication comprises a phantom instruction routed through the second pipeline. This "phantom" instruction preferably serves no purpose within the second pipeline other than to cause the second counter to be incremented when that phantom instruction reaches a predetermined stage of the second pipeline.

In preferred embodiments, the phantom instruction is routed into the second pipeline at the same time as the instruction causing the phantom instruction to be generated is routed into the first pipeline. In such embodiments, the counter logic is preferably arranged to increment the second counter when the phantom instruction reaches the retirement stage of the second pipeline.

It will be appreciated by those skilled in the art that the time at which the first counter is incremented following determination that the exception status of an instruction in the first pipeline is resolved can be varied dependent on the implementation. However, in preferred embodiments, the counter logic is arranged to increment the first counter upon said determination that the exception status of the instruction is resolved unless an exception was issued by the first pipeline when the exception status was resolved. Hence, in the event that an exception is issued by the first pipeline when the exception status is resolved, the first counter is not incremented.

When the incrementation of the first counter by the counter logic is managed in such a way, the synchronisation logic is preferably arranged, when an instruction is in the retirement stage of the second pipeline, to determine that that instruction can be retired if the value of the second counter is not greater than the value of the first counter. Hence, if the value of the second counter is less than or equal to the value of the first counter, this means that there are no preceding instructions from the instruction sequence within the first pipeline that could still give rise to an exception, and that accordingly it is safe to retire the instruction that is currently at the retirement stage of the second pipeline.

Hence, when the first counter is managed as described above, out of order retirement of instructions can be performed whilst still ensuring that no instructions are retired before the exception status of any preceding instructions in the instruction sequence is known.

In some implementations, it is desired that the processor only retires instructions in order. For example, in some implementations, the issue of interrupt latency (i.e. the time required between identifying an interrupt, and being in a position to be able to process that interrupt, due to for example needing to flush the contents of the pipelines prior to handling the interrupt) can be of particular concern. Hence, in situations where it is desired to minimise the interrupt latency, it can be advantageous to ensure that only in order retirement of instructions is allowed.

The inventors of the present invention realised that in order retirement of instructions can be forced upon the processor merely by changing the time at which the counter logic is arranged to increment the first counter. More specifically, in embodiments where in order retirement is desired, the counter logic is arranged to increment the first counter when the instruction for which it has been determined that the exception status is resolved reaches the retirement stage of the first pipeline, unless an exception was issued by the first pipeline when the exception status was resolved. Hence, by delaying incrementation of the first counter until the relevant instruction in the first pipeline reaches the retirement stage, the analysis performed by the synchronisation logic can remain unchanged, and hence, when an instruction is in the retirement stage of the second pipeline, the synchronisation logic is still arranged to determine that that instruction can be retired if the value of the second counter is not greater than the value of the first counter. However, in this instance, that same analysis now ensures that instructions in the sequence are retired in order.

The way in which the counter logic manages the update of the first counter may be predetermined for any particular implementation, or alternatively may be programmable. To allow programmability in this respect, the data processing apparatus of preferred embodiments further comprises a status field operable to identify when the counter logic is to increment the first counter, such that if the status field has a first value, the counter logic is arranged to increment the first counter upon said determination that the exception status of the instruction is resolved unless an exception was issued by the first pipeline when the exception status was resolved, whereas if the status field has a second value, the counter logic is arranged to increment the first counter when the instruction for which it has been determined that the exception status is resolved reaches the retirement stage of the first pipeline unless an exception was issued by the first pipeline when the exception status was resolved.

As described earlier, if at the retirement stage of the second pipeline, it is determined that the value of the second counter is not greater than the value of the first counter, then the corresponding instruction at the retirement stage of the second pipeline can be retired. However, if the value of the second counter exceeds the value of the first counter, then the synchronisation logic of preferred embodiments is arranged to cause the instruction to be stalled in the retirement stage of the second pipeline, unless in addition an exception was issued by the first pipeline when the exception status was resolved, in which event any instructions in the second pipeline are caused to be discarded without those instructions being retired in the retirement stage of the second pipeline. Hence, in the absence of an exception, the instruction is stalled in the retirement stage of the second pipeline until such time is reached where the second counter no longer exceeds the value of the first counter, at which point the instruction can be retired. However, if prior to that time being reached an exception is issued by the first pipeline, this will mean that an instruction preceding the instruction in the retirement stage of the second pipeline has given rise to an exception, and that accordingly the instructions being executed within the second pipeline should be discarded. This process is typically performed by flushing the second pipeline.

It will be appreciated that the first and second counters will typically be of a fixed size. Hence, at some point their maximum value will be reached. It would be possible to provide some form of reset procedure to cause the counters to be reset at this point, but that would clearly also involve introducing a break in instruction execution, and accordingly would be an unattractive route unless the size of the counters were large enough to ensure that a reset procedure was only required relatively infrequently. However, typically it would be desirable to keep the size of the first and second counters relatively small, given the general desire to reduce the size and cost of processors, and to increase speed. Accordingly, in preferred embodiments, said first and second counters are fixed size counters whose values wrap to a minimum value when a maximum value is exceeded. This enables the size of the counters to be kept relatively small, whilst ensuring that no reset procedures are required when either counter reaches the maximum value.

In particularly preferred embodiments, the first and second counters are both three bit counters and the values stored within the counters are in two-s complement form, thus allowing a range of values from −4 to +3. The synchronisation logic is then arranged in such a way that the above described comparisons of the two counter values in order to determine whether to retire an instruction or to stall an instruction still produce the correct result.

It will be appreciated that the first and second pipelines may take a variety of forms. For example, they may be pipelines which are identical other than that all "exception causing instructions" are routed to the first pipeline, these pipelines being provided to improve the throughput of instructions through the processor, with the decision as to which pipeline to route any particular "non-exception causing" instruction into being taken dependent on how busy each pipeline is at that time. However, in preferred embodiments, the first pipeline is a load/store pipeline for executing load or store instructions, whilst the second pipeline is an arithmetic logic pipeline for executing data processing instructions. In such preferred embodiments, the exception status is preferably an abort status identifying whether the load or store instruction will generate an abort exception or not.

As mentioned earlier, on retirement of an instruction, the state of the data processing apparatus is updated to reflect the result of execution of that instruction. In preferred embodiments, the state that is updated when retiring an instruction comprises the contents of a set of registers accessible by the processor.

It will be appreciated that the predetermined criteria used by the processor to determine into which pipeline to route an instruction in the sequence can take a variety of forms, dependent on the implementation. For example, as described earlier, in the event that the pipelines are identical (other than that all "exception causing instructions" are routed to the first pipeline), the predetermined criteria may involve a determination as to which pipeline is least busy. However, in preferred embodiments, the predetermined criteria comprises instruction type, such that instructions of certain types are routed into the first pipeline whilst instructions of other types are routed into the second pipeline.

Viewed from a second aspect, the present invention provides a method of synchronising a first pipeline and a second pipeline of a processor arranged to execute a sequence of instructions, the processor being arranged to route an instruction in the sequence through either the first or the second pipeline dependent on predetermined criteria, each pipeline having a plurality of pipeline stages including a retirement stage, the method comprising the steps of: (a) providing a first counter relating to the first pipeline and a second counter relating to the second pipeline; (b) for each instruction in the first pipeline, determining when that instruction reaches a point within the first pipeline where an exception status of that instruction is resolved; (c) incrementing the first counter responsive to said determination at said step (b); (d) generating an indication within the second pipeline each time an instruction is routed to the first pipeline; (e) incrementing the second counter responsive to said indication generated at said step (d); (f) when an instruction is in the retirement stage of the second pipeline, determining with reference to the values of the first and second counters whether that instruction can be retired; and (g) if said determination at said step (f) indicates that that instruction can be retired, updating a state of the data processing apparatus dependent on the result of execution of that instruction.

Viewed from a third aspect, the present invention provides a computer program product carrying a computer program for controlling a data processing apparatus to synchronise a first pipeline and second pipeline of a processor in accordance with the method of the second aspect of the present invention.

BRIEF DESCRIPTION OF THE DRAWINGS

The present invention will be described further, by way of example only, with reference to a preferred embodiment thereof as illustrated in the accompanying drawings, in which:

FIGS. 5A and 5B illustrate for various worked examples the computation performed by the adder of FIG. 4 used to subtract the two counters.

DESCRIPTION OF A PREFERRED EMBODIMENT

Figure 1:
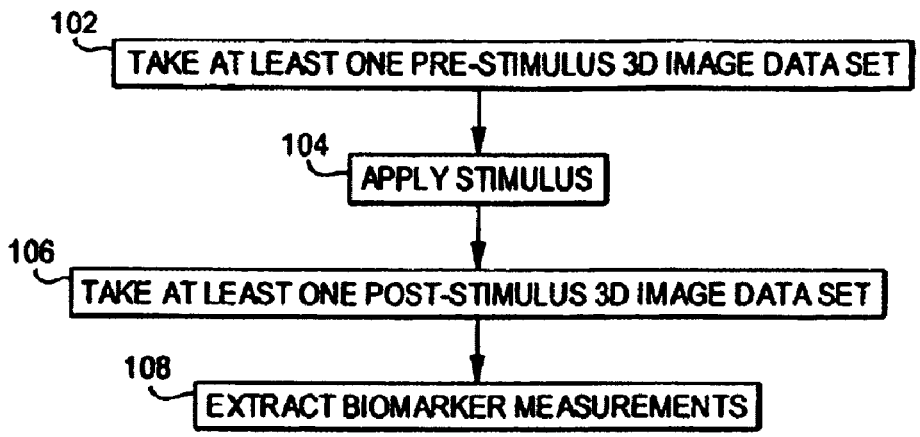
FIG. 1 is a block diagram of a system in which the techniques of preferred embodiments of the present invention may be implemented.

FIG. 1 is a block diagram illustrating a data processing system in which the techniques of preferred embodiments of the present invention may be employed. As shown in FIG. 1, a processor core 40 is coupled to a cache or other memory device 10 from which instructions required by the processor core 40 may be accessed. Within the processor core 40, a prefetch unit 20 is provided for issuing over path 50 requests for instructions determined by the prefetch unit to be required by the pipelined processor 30. The cache or other memory device 10 from which the instructions are retrieved then outputs the instructions back to the prefetch unit 20 over path 60, from where they are passed over path 70 into the pipelined processor 30. When executing instructions, the pipelined processor 30 will interface with the registers of register bank 35 containing data values to be manipulated by the instructions. Load instructions are used to load data values into the register bank from memory, and store instructions are used to store data values into memory from the register bank. Data processing instructions may then be executed on the data values stored in particular registers.

In the event that any of the pipeline stages of the pipelined processor 30 becomes stalled, due to for example a particular instruction needing to stay for several cycles within a particular pipeline stage, then this may result in a stall signal being output to the prefetch unit 20 over path 80. Typically, the prefetch unit 20 will incorporate an instruction buffer for storing temporarily instructions retrieved over path 60 but which do not yet need to be issued to the pipelined processor 30 over path 70. Accordingly, the presence of a stall signal on path 80 will not necessarily cause the prefetch unit 20 to stall its operation, unless that internal instruction buffer within the prefetch unit is full.

Figure 2:
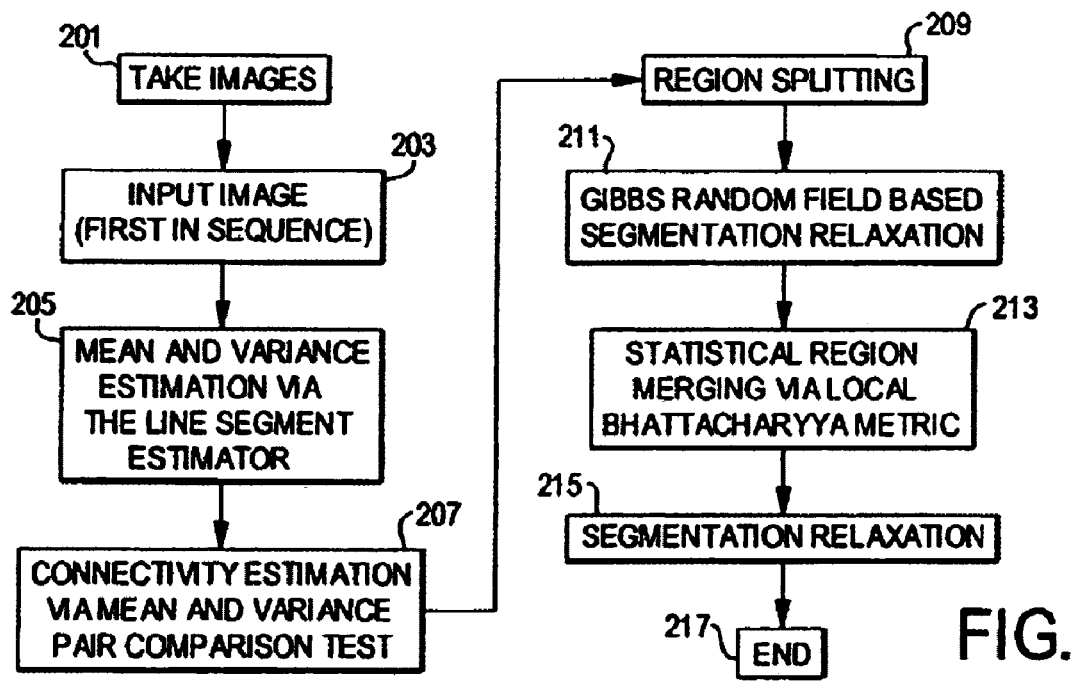
FIG. 2 is a diagram schematically illustrating a pipelined processor in accordance with preferred embodiments of the present invention.

FIG. 2 is a block diagram illustrating the various pipeline stages provided within the pipelined processor 30 of FIG. 1 in accordance with preferred embodiments of the present invention. At stage 100, an instruction received from the prefetch unit 20 is decoded, and is then subsequently passed to the issue stage 110, where the data required by the instruction is obtained from the appropriate registers of the register bank 35.

Thereafter, the instruction moves to the address generation/shift stage 120. For a load or store operation, the process performed at this stage is to generate the address required for the memory access that is to be used to effect the load or store operation. This process will typically involve adding the values of two registers together, or adding the value of a register to an "immediate" value specified within the instruction, etc. For an arithmetic logic instruction, for example an add instruction or a subtract instruction, pipeline stage 120 provides shift logic to enable any required shifting of the operands to be performed.

At this point, the processor branches into two pipelines, the first pipeline containing pipeline stages 130, 140 and 150, and the second pipeline containing pipeline stages 160, 170 and 180. The first pipeline is a load/store pipeline used to process load or store instructions, and accordingly a load or store instruction will be routed from pipeline stage 120 into pipeline stage 130. Stages 130 and 140 are two memory pipeline stages, during which the memory access required by the load or store instruction takes place. In the preferred embodiments of the invention illustrated in FIG. 2, there are two memory stages 130, 140, since load and store operations will in such embodiments typically take at least two clock cycles.

When the memory access has completed, the instruction will move from the memory 2 pipeline stage 140 into the write back stage 150, also referred to herein as a retirement stage. In the write back stage, the register bank 35 is prepared for updating to reflect the result of the load or store operation, that update taking place at the end of the write back stage.

Any arithmetic logic instructions, such as add or subtract instructions, will be routed from the pipeline stage 120 into the pipeline stage 160 of the second pipeline, which incorporates an arithmetic logic unit for executing that arithmetic logic instruction. After the execution stage, the instruction is passed to the saturation stage 170 of the pipeline, where any required saturation of the result is performed. For example, some arithmetic logic instructions require that the result is saturated to a predetermined number of bits, and hence as an example may require a 16 bit result to be saturated to a 9 bit result. Such a process is performed within pipeline stage 170. After any required saturation, the instruction is then passed to the write back stage 180, also referred to herein as a retirement stage. As described earlier with reference to the write back stage 150, the purpose of the write back stage is to update the state of the data processing apparatus, and in particular to update the register bank 35, having regard to the result of execution of the instruction in the write back stage.

In an ideal scenario, each instruction spends one cycle in each pipeline stage, and then moves to the next pipeline stage. However, as will be appreciated by those skilled in the art, there are various scenarios in which it will be necessary to keep an instruction within a particular pipeline stage for more than one clock cycle, for example because the processing of that instruction required by that pipeline stage will require more than one clock cycle, or because processing of that instruction at that pipeline stage cannot take place in the current clock cycle because all of the information or data required to enable that processing to take place is not available. In such scenarios, the particular pipeline stage in question will issue one or more stall signals which are then processed by control logic of the pipelined processor to determine whether it is necessary to stall any preceding pipeline stages. Typically, assuming the immediately preceding pipeline stage contains an instruction, it will be stalled, and this stall will be replicated down the pipeline.

In one embodiment, all preceding pipeline stages will always be stalled upon issuance of the stall signal, whilst in an alternative embodiment, the preceding pipeline stages will only be stalled until such a point is reached where an empty pipeline stage exists. At that point, a stall is no longer required, since that empty pipeline stage will still be available to receive an input from a preceding pipeline stage. The logic used in preferred embodiments to effect this latter type of stall propagation within the pipelined processor 30 is illustrated schematically with reference to FIG. 3, which illustrates the three stages of the second pipeline used to handle arithmetic logic instructions. Any stall signals (in preferred embodiments the stall signal being set to a logic one value to indicate a stall) generated by the execute stage 160, the saturation stage 170 or the write back stage 180 are output to corresponding OR gates 270, 230, 200, respectively.

If a stall signal is generated by the write back stage 180, then this will be output via the OR gate 200 to AND gate 210, which will then output that stall signal provided that an input received from flop 220 confirms that the write back stage is "full", i.e. contains an instruction. It will be appreciated by those skilled in the art that the AND gate 210 may not be necessary if the stall signal is to be generated regardless of whether or not the write back stage 180 is full.

Figure 3:
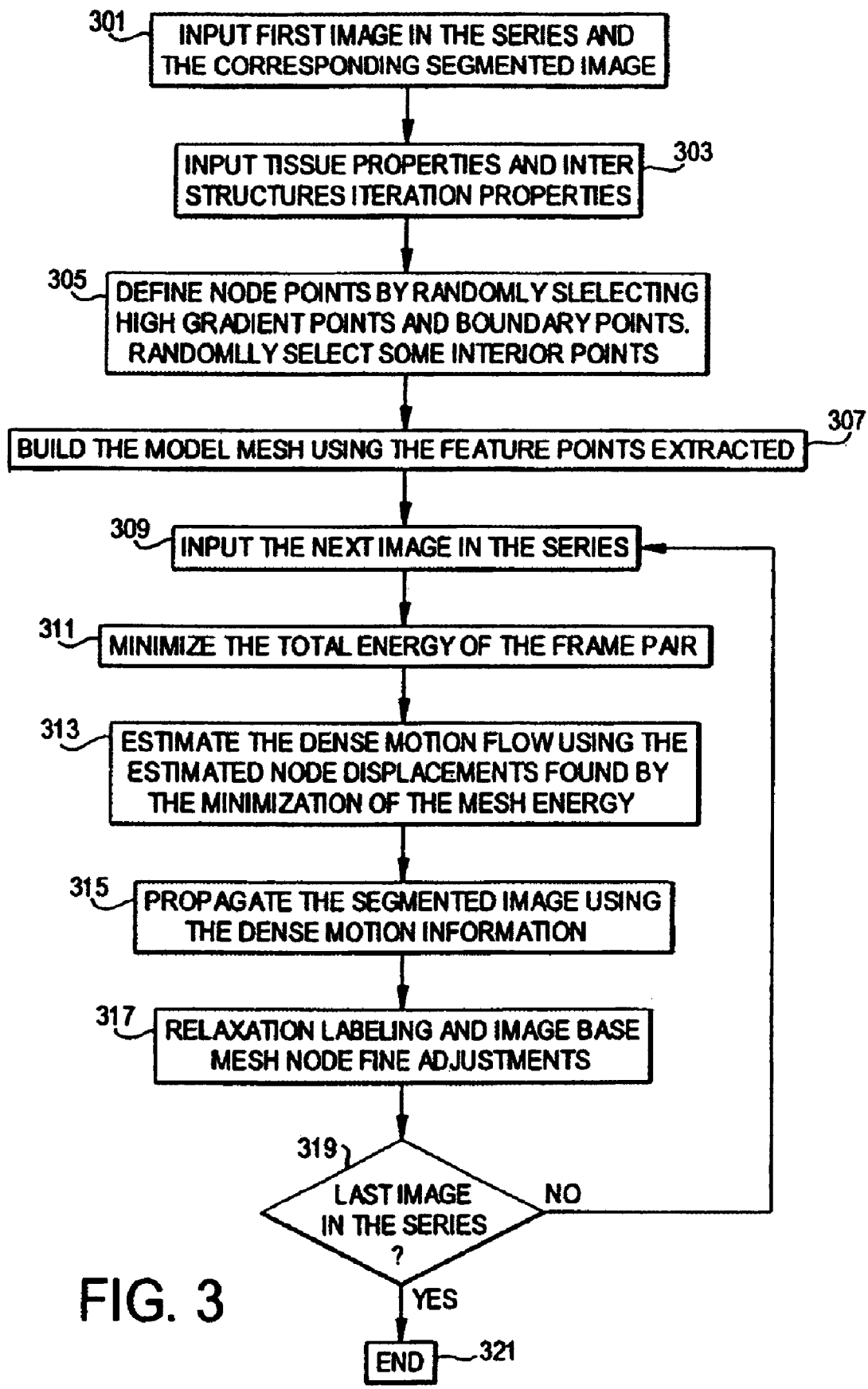
FIG. 3 is a diagram illustrating the processing of stall signals generated by various pipeline stages of the pipelined processor of FIG. 2.

A set stall signal output by AND gate 210 will be routed via path 212 to AND gate 174, where that signal is inverted prior to entering the AND gate 174. Hence, this will ensure that a clock signal is only output to flop 172 if a stall signal has not been issued by the write back stage 180. In the event of a stall signal issued by write back stage 180, the flop 172 will not receive a clock signal, and accordingly will not generate any output to the write back stage 180 at that time. It will be appreciated by those skilled in the art that although only a single flop 172 is illustrated in FIG. 3, there will typically be a number of flops at the output of each pipeline stage, and they would all be controlled in a similar manner.

OR gate 240 serves to OR together any stalled signals generated by the saturation stage 170 or by the write back stage 180, with the output of OR gate 240 then being passed to AND gate 260. AND gate 260 will then output any stall signal received from OR gate 240 provided that flop 250 indicates that the saturation stage 170 is full.

In the event of a stall signal being output by AND gate 260, this will cause AND gate 164 to suppress generation of the clock signal to flop 162, and accordingly to ensure no output is passed by the execute stage 160 to the saturation stage 170.

OR gate 280 then serves to OR together any stall signals generated by the execute stage 160 with any stall signal output from AND gate 260, with any resulting stall signal then being routed to AND gate 290 for outputting from the AND gate if flop 295 indicates that the execute pipeline 160 is full. The output from AND gate 290 is then passed to the address generation/shift pipeline stage 120 for propagation in an analogous manner through the rest of the pipeline stages. Given FIG. 2, it will be appreciated that the address generation/shift pipeline stage 120 will also receive a stall signal from the memory 1 pipeline stage 130 and will be arranged to OR together any stall signals generated within its own stage with any stall signal generated by either the memory 1 pipeline stage 130 or the execute pipeline stage 160.

From the above description of FIG. 3, it will be appreciated that the stall signal basically propagates back down the pipeline to stall all preceding pipeline stages unless an empty pipeline stage is encountered. As soon as an empty pipeline stage is encountered, the stall signal is suppressed so as to allow any preceding pipeline stages to operate normally.

The construction of the pipelined processor illustrated in FIG. 2 is such that at the time an instruction is routed to the first pipeline, the exception status of that instruction will not typically have been resolved, and hence it will not be known whether execution of that instruction will in fact cause an exception. Further, given the earlier discussion of the way in which stalls are propagated through the individual pipelines, it will be appreciated that once the instructions of the instruction sequence have been routed into the first or second pipeline as appropriate, it can no longer be ensured that those instructions will reach the write back stage 150 or the write back stage 180 in the original order of the instruction sequence. For example, if a load instruction is routed into the first pipeline, followed by an add instruction being routed into the second pipeline, the add instruction may reach the write back stage 180 before that previous load instruction has reached the write back stage 150.

Whilst many systems allow out or order retirement of instructions, and accordingly this is not in itself a problem, it is important that any particular instruction is not retired if a preceding instruction in the instruction sequence has not yet been retired and could still produce an exception. This is due to the fact that when an exception is encountered for a particular instruction, it is typically necessary to flush all pending instructions from the pipeline, to then handle the exception, and then to return to the next instruction in the sequence. Given the presence of the exception, the execution of the next instruction in the sequence may generate a different result to that which would otherwise have been produced had the exception not occurred, and accordingly it is very important that that next instruction has not been retired from the pipeline prior to the exception being detected and handled.

Figure 4:
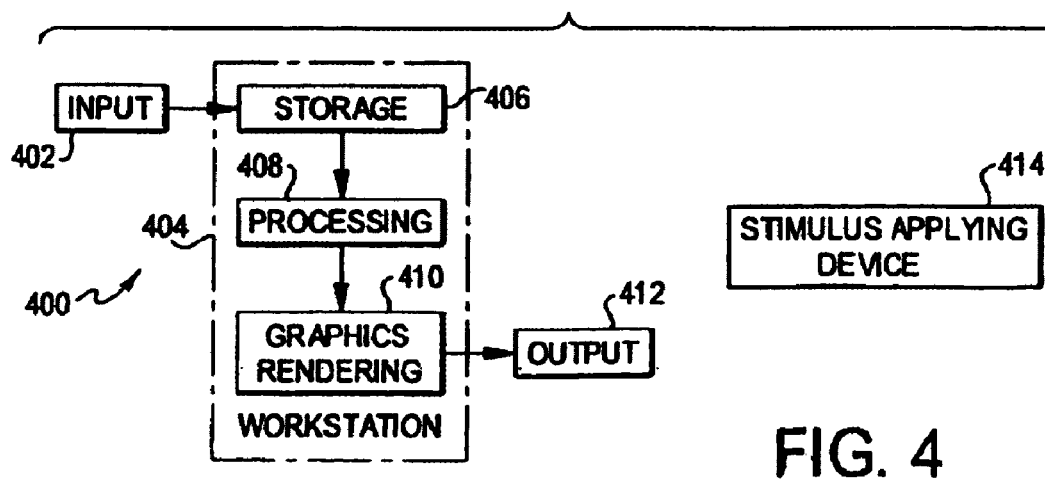
FIG. 4 is a block diagram illustrating the counter logic and synchronisation logic used within the write back stage of the arithmetic logic pipeline of FIG. 2.

In preferred embodiments, this problem is resolved by the provision of synchronisation logic and counter logic within the write back stage 180 of the second pipeline, the counter and synchronisation logic of preferred embodiments being illustrated in FIG. 4.

As shown in FIG. 4 a first counter 340, 350, 360, 370 is provided whose output is incremented upon a determination that the exception status of an instruction in the first pipeline has been resolved without an exception being generated. At that point, it is then clear that the instruction within the first pipeline will be able to retire without an exception being generated. Accordingly, this first counter is also referred to herein as a retirement counter.

At initialisation, the counter value stored within flop 340 will be 0, and the multiplexer 350 will be arranged to output that value. This output value is then input into incrementer 360, resulting in an incremented version of the counter value being stored in flop 370. When a determination is made within the first pipeline that the exception status of an instruction within that first pipeline has been resolved without an exception being issued, then this determination will result in the generation by the first pipeline of an increment signal input to multiplexer 350 over path 355. As illustrated in FIG. 4, this signal is set to a logic 1 value if the exception status has been resolved and no exception has been generated. When that signal on path 355 is set to 1, this will cause the multiplexer 350 to output the incremented counter value, whereas otherwise the un-incremented value will be output. Whatever value is output by the multiplexer 350 is routed to an input of adder 330, and also stored back to the flop 340 via multiplexer 390. Further an incremented version of that value will be generated by incrementer 360 and stored in flop 370.

A second counter 300, 310, 315, 320 is also provided. As with the first counter, the flop 300 of the second counter is set to zero at initialisation, this value being output by the multiplexer 315 thereby causing an incremented version to be generated by incrementer 320 which is stored within flop 310.

In accordance with preferred embodiments of the present invention, the pipelined processor 30 is arranged such that whenever an instruction is issued from the address generation/shift pipeline stage 120 into the first pipeline, a phantom instruction is at the same time issued into the second pipeline. The sole purpose of the phantom instruction is to cause a phantom signal to be issued over path 318 to the multiplexer 315 when that phantom instruction reaches a predetermined point in the second pipeline. In preferred embodiments, this phantom signal is generated when the phantom instruction reaches the write back stage 180. When the phantom signal is set, this will cause the multiplexer 315 to output the incremented version of the second counter which is then inverted prior to input to the other input of the adder 330. The value output from the multiplexer 315 is also routed back to the flop 300, and in addition, for the reasons discussed later, is also input to multiplexer 390. Further, an incremented version will be generated by incrementer 320 and stored in flop 310.

This second counter hence in effect keeps track of the number of load or store instructions input into the load/store pipeline, and accordingly will also be referred to hereafter as a load counter.

In preferred embodiments both the load counter and the retirement counter are three bit counters whose values are arranged to wrap to a minimum value when a maximum value is exceeded. The values within the counters are stored in two-s complement format, and accordingly enable a range of values from −4 to +3.

The purpose of the adder 330 is to implement the synchronisation logic. The synchronisation logic is arranged to determine that an instruction at the retirement stage of the second pipeline can be retired if the value of the load counter is not greater than the value of the retirement counter. Having regard to the information that the load counter and the retirement counter store, it will be appreciated that such comparison is concluding that if the load counter is less than or equal to the retirement counter, then there are no preceding instructions in the instruction sequence that can still give rise to an exception, and accordingly that it is safe to retire that instruction.

Conversely, if the value of the load counter does exceed the value of the retirement counter, then the synchronisation logic should cause the instruction in the write back stage 180 to be stalled in that clock cycle, since in such a scenario this will indicate that there is at least one preceding instruction being handled by the load/store pipeline that could still generate an exception. If the value of the load counter exceeds the value of the retirement counter, and additionally an exception was issued by the first pipeline when the exception status of the corresponding instruction was resolved, then rather than stalling the instruction in the write back stage 180, it will instead be necessary to flush the second pipeline, this function being achieved via AND gate 380. It should be noted that the presence of an exception at the memory 2 stage 140 of the first pipeline (i.e. the stage where the exception status is resolved in preferred embodiments) also causes the instructions following that instruction in the first pipeline to be flushed.

Accordingly, as can be seen from FIG. 4, if a stall signal (given by bit 2 of the result generated by the adder 330, and set to a logic 1 value to indicate a stall) is output from the adder 330, and an exception signal is set to indicate that an exception has been detected in the first pipeline, this will cause AND gate 380 to output a flush signal set to a logic 1 value, which will be used by the control logic of the pipeline to flush the contents of the second pipeline. In addition, this flush signal is input to multiplexer 390 to ensure that in the event of a flush, the flops 300, 340 of the two counters are set to the same value, in the example illustrated in FIG. 4, both flops being set to the value currently stored in flop 300. This is required since the comparison process performed by the adder 330 assumes that at initialisation the value of both counters was the same.

With the pipelined processor illustrated in FIG. 2, it is clear that the load counter cannot be incremented by three more than the retirement counter, and vice versa. This fact is used to determine the required counter size. The counter size must be at least the value given by the equation:

$$\text{RoundUp } (\log_2 (\text{Max}_{13} \text{ diff}))+1$$

Hence, for the above described implementation, this determines that the counter size should be at least 3 bits.

As described earlier the comparison that needs to be performed in order to determine whether the instruction in the write back stage of the second pipeline can or cannot be retired is the comparison as to whether the load counter is greater than the retirement counter. If the load counter is greater than the retirement counter, then the instruction needs to be stalled unless an exception has been generated, whereas otherwise it is safe to retire the instruction. The determination as to whether the load counter is greater than the retirement counter is implemented by the adder 330 subtracting the load counter value from the retirement counter value. As will be appreciated by those skilled in the art, if the result of this computation is negative, this means that the load counter did exceed the retirement counter, and that accordingly a stall signal should be generated. If the result is negative, i.e. the load counter is greater than the retirement counter then this will be indicated by a logic 1 value in bit 2 of the result, as is illustrated by way of example with reference to FIGS. 5A and 5B.

FIG. 5A illustrates a variety of examples where the load counter is greater than the retirement counter, and accordingly where the subtraction of the load counter from the retirement counter will produce a negative result. As can be seen from FIG. 5A, in all such examples bit 2 of the result is set to a logic 1 value, and hence can be used to trigger the stall signal. FIG. 5B illustrates a variety of examples where the load counter is not greater than the retirement counter and where accordingly the subtraction of the load counter from the retirement counter will not be less than zero. As can be seen from FIG. 5B, in all such examples bit 2 of the result is set to zero, indicating that no stall is required. Since no stall is required, this indicates that the instruction in the write back stage 180 can be retired.

Figure 6A:
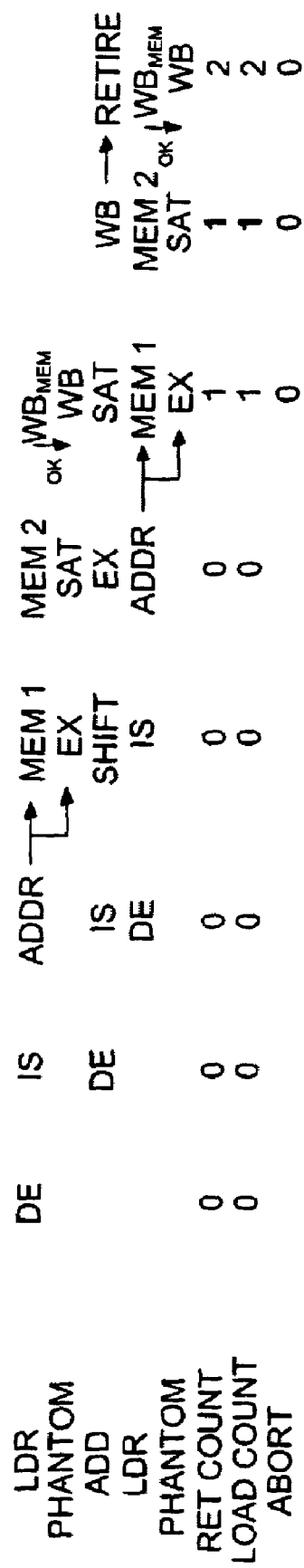
FIGS. 6A to 6C are diagrams illustrating the progress of an example sequence of instructions through the pipelined processor of FIG. 2 in various scenarios.
Figure 6B:
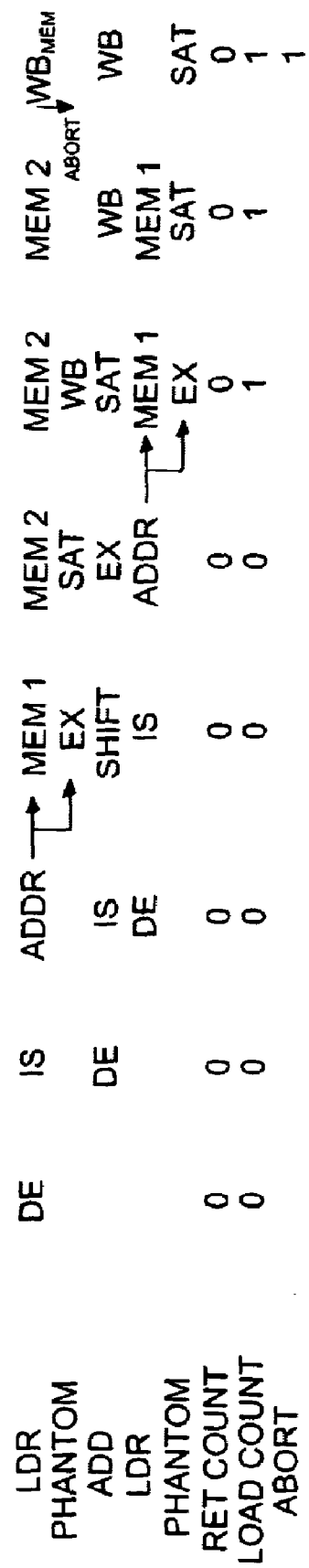
Figure 6C:
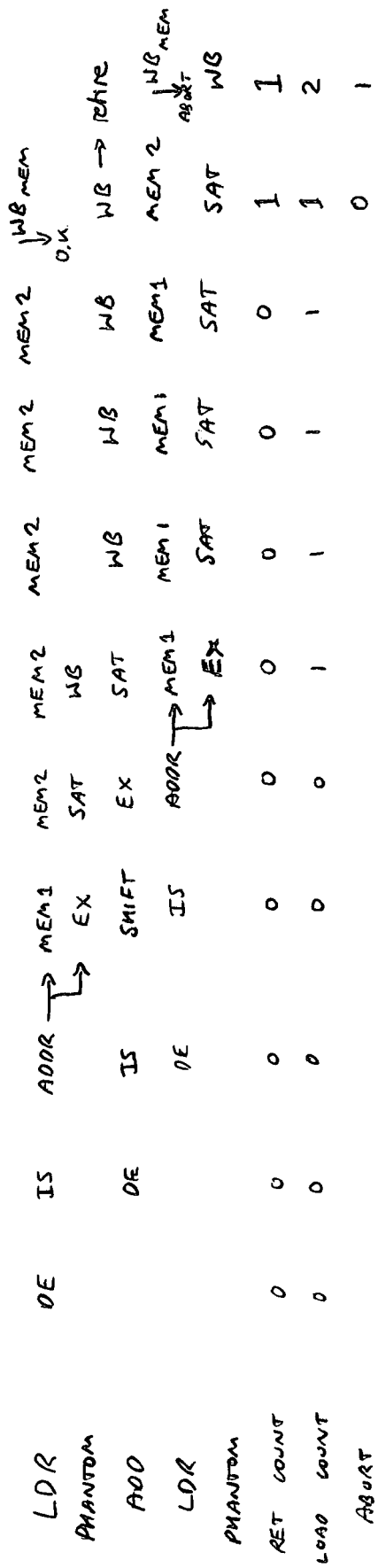

FIGS. 6A to 6C are diagrams schematically illustrating the progress of three instructions through the pipelined processor of FIG. 2 in various scenarios. In each case, the instruction sequence is a load (LDR) instruction followed by an add (ADD) instruction, followed by a further load (LDR) instruction.

FIG. 6A illustrates the example where no stalling of the load instruction occurs within the load/store pipeline, and where neither load instruction generates an abort exception. As can be seen, when the first load instruction is passed from the address generation/shift pipeline stage 120 into the memory one pipeline stage 130 of the first pipeline, this also causes a phantom instruction to be passed to the execute stage 160 of the second pipeline.

When the phantom instruction reaches the write back stage of the pipeline, this causes the load counter to be incremented. Similarly, when the load instruction reaches the end of the memory 2 stage 140, its exception status is resolved, and it is determined that no abort will be issued, this enabling the retirement counter to also be incremented at the beginning of the write back stage 150. As a result of this, when the add instruction reaches the write back stage, it is determined by the synchronisation logic that the load counter value is not greater than the retirement counter value, and that accordingly the add instruction can be retired. When the next load instruction is passed into the memory one stage of the first pipeline, a phantom instruction is also passed into the execute stage of the second pipeline, and again when the phantom instruction reaches the write back stage 180, it will cause the load counter to be incremented. However, at the same time, the load instruction will reach the write back stage 150, and the absence of an exception being generated will enable the retirement counter to also be incremented, this ensuring that the retirement counter and load counter values remain equal. Hence, if the next instruction in the sequence were another arithmetic logic instruction, it will be seen that when that instruction reaches the write back stage, it will also be able to be retired.

FIG. 6B illustrates an example where it takes a number of additional cycles within the memory two stage of the pipeline in order to determine the exception status of the first load instruction. Hence, whilst when the associated phantom instruction reaches the write back stage, the load counter can be incremented, it is not possible at the same time to increment the retirement counter. Hence, when the add instruction reaches the write back stage, it is determined that the value of the load counter exceeds the value of the retirement counter, and that accordingly the add instruction must be stalled for a further cycle in the write back stage. In the next cycle, an abort is issued for the first load instruction, this suppressing the incrementation of the retirement counter. As a result, it is determined during that cycle that the load counter value still exceeds the retirement counter value, but that in addition an abort signal has been issued, and that accordingly the second pipeline should be flushed. This results during the next cycle in both the add instruction and the second phantom instruction being flushed from the pipeline. In addition, the second load instruction is flushed from the first pipeline following detection of the exception for the first load instruction.

FIG. 6C is a similar example where the exception status of the first load instruction cannot be resolved for several additional cycles, but where when it is ultimately resolved, no exception is generated. As can be seen, in this example, the load counter is again incremented to one when the first phantom instruction reaches the write back stage, but the retirement counter can only be incremented to one when the first load instruction is passed from the memory two stage to the write back memory stage, due to the resolution of the exception status at that point. In the intervening period, the add instruction is stalled for three cycles in the write back stage 180. However, once the retirement counter is incremented, then the synchronisation logic will determine that the value of the second counter is no longer greater than the value of the first counter, and that accordingly the add instruction can be retired.

The second load instruction is also stalled in the memory one stage of the pipeline due to the presence of the first load instruction in the memory two stage of the pipeline. When that load instruction is subsequently able to move into the memory two stage, its exception status is determined during that cycle, but results in the generation of an abort as the instruction is passed from the memory two stage to the write back stage 150. This suppresses incrementation of the retirement counter. However, the second phantom instruction, which was stalled in the saturation stage whilst the add instruction was stalled in the write back stage, has now moved to the write back stage, and accordingly has caused the load counter to be incremented to two. At this point, the synchronisation logic will determine that the second counter value exceeds the value of the first counter, and in addition an exception has been generated and accordingly this will cause the contents of the second pipeline to be flushed.

As mentioned earlier, the pipelined processor of preferred embodiments of the present invention is able to support both out of order and in order retirement of instructions, as desired. A status bit would typically be provided within the control logic of the pipeline which is settable to indicate whether out of order retirement or in order retirement is desired. If out of order retirement is desired, then upon determination that the exception status of an instruction in the first pipeline has been resolved and no exception has been issued, a logic one signal is generated at that time by the first pipeline over path 355 to the multiplexer 350, to cause the retirement counter to be incremented. Using the example illustrated with reference to FIGS. 6A to 6C, this enables the add instruction to be retired before the preceding load instruction has been retired. If the status register is set to a second value, to indicate that in order retirement is required, then this will cause the logic one value input to multiplexer 350 over path 355 to only be generated when the associated instruction in the load/store pipeline has reached the write back stage, and is accordingly being retired. Again considering the example shown in FIG. 6A to 6C, the deferring of the incrementation of the retirement counter until that time ensures that the add instruction can only be retired once the preceding load instruction has been retired.

From the above description, it will appreciated that the preferred embodiment of the present invention provides a particularly simple and effective technique for synchronising multiple pipelines to ensure that instructions are not retired until the exception status of any preceding instructions has been resolved.

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

We claim:

1. A data processing apparatus comprising:
   a processor for executing a sequence of instructions, the processor having a first pipeline and a second pipeline, the processor routing an instruction in the sequence through either the first or the second pipeline dependent on predetermined criteria, each pipeline having a plurality of pipeline stages including a retirement stage;
   counter logic for maintaining a first counter relating to the first pipeline and a second counter relating to the second pipeline, and, for each instruction in the first pipeline, for making a determination as to when that instruction reaches a point within the first pipeline where an exception status of that instruction is resolved, and for incrementing the first counter responsive to said determination, the processor generating an indication within the second pipeline each time an instruction is routed to the first pipeline, and the counter logic for incrementing the second counter responsive to said indication; and
   synchronisation logic, when an instruction is in the retirement stage of the second pipeline, for determining with reference to the values of the first and second counters whether that instruction can be retired, and if the instruction can be retired the retirement stage causes an update of a state of the data processing apparatus dependent on the result of execution of that instruction.

2. A data processing apparatus as claimed in claim 1, wherein the indication generated within the second pipeline each time an instruction is routed to the first pipeline comprises a phantom instruction routed through the second pipeline.

3. A data processing apparatus as claimed in claim 2, wherein the phantom instruction is routed into the second pipeline at the same time as the instruction causing the phantom instruction to be generated is routed into the first pipeline.

4. A data processing apparatus as claimed in claim 3, wherein the counter logic increments the second counter when the phantom instruction reaches the retirement stage of the second pipeline.

5. A data processing apparatus as claimed in claim 1, wherein the counter logic increments the first counter upon said determination that the exception status of the instruction is resolved unless an exception was issued by the first pipeline when the exception status was resolved.

6. A data processing apparatus as claimed in claim 5, wherein the synchronisation logic, when an instruction is in the retirement stage of the second pipeline, determines that the instruction can be retired if the value of the second counter is not greater than the value of the first counter.

7. A data processing apparatus as claimed in claim 1, wherein the counter logic increments the first counter when the instruction for which it has been determined that the exception status is resolved reaches the retirement stage of the first pipeline unless an exception was issued by the first pipeline when the exception status was resolved.

8. A data processing apparatus as claimed in claim 7, wherein the synchronisation logic, when an instruction is in the retirement stage of the second pipeline, determines that the instruction can be retired if the value of the second counter is not greater than the value of the first counter, thereby ensuring that instructions in the sequence are retired in order.

9. A data processing apparatus as claimed in claim 1, further comprising a status field for identifying when the counter logic is to increment the first counter, such that if the status field has a first value, the counter logic increments the first counter upon said determination that the exception status of the instruction is resolved unless an exception was issued by the first pipeline when the exception status was resolved, whereas if the status field has a second value, the counter logic increments the first counter when the instruction for which it has been determined that the exception status is resolved reaches the retirement stage of the first pipeline unless an exception was issued by the first pipeline when the exception status was resolved.

10. A data processing apparatus as claimed in claim 1, wherein the synchronisation logic, when an instruction is in the retirement stage of the second pipeline, and if the value of the second counter exceeds the value of the first counter, causes the instruction to be stalled in the retirement stage, unless in addition an exception was issued by the first pipeline when the exception status was resolved, in which event any instructions in the second pipeline are caused to be discarded without those instructions being retired in the retirement stage of the second pipeline.

11. A data processing apparatus as claimed in claim 1, wherein said first and second counters are fixed size counters whose values wrap to a minimum value when a maximum value is exceeded.

12. A data processing apparatus as claimed in claim 1, wherein the first pipeline is a load/stare pipeline operable to execute load or store instructions.

13. A data processing apparatus as claimed in claim 12, wherein said exception status is an abort status.

14. A data processing apparatus as claimed in claim 1, wherein the second pipeline is an arithmetic logic pipeline operable to execute data processing instructions.

15. A data processing apparatus as claimed in claim 14, wherein the state of the data processing apparatus to be updated when retiring an instruction comprises the contents of a set of registers accessible by the processor.

16. A data processing apparatus as claimed in claim 1, wherein the predetermined criteria used by the processor to determine into which pipeline to route an instruction in the sequence comprises instruction type.

17. A method of synchronising a first pipeline and a second pipeline of a processor for executing a sequence of instructions, the processor routing an instruction in the sequence through either the first or the second pipeline dependent on predetermined criteria, each pipeline having a plurality of pipeline stages including a retirement stage, the method comprising the steps of:
(a) providing a first counter relating to the first pipeline and a second counter relating to the second pipeline;
(b) for each instruction in the first pipeline, determining when that instruction reaches a point within the first pipeline where an exception status of that instruction is resolved;
(c) incrementing the first counter responsive to said determination at said step (b);
(d) generating an indication within the second pipeline each time an instruction is routed to the first pipeline;
(e) incrementing the second counter responsive to said indication generated at said step (d);
(f) when an instruction is in the retirement stage of the second pipeline, determining with reference to the values of the first and second counters whether that instruction can be retired; and
(g) if said determination at said step (f) indicates that that instruction can be retired, updating a state of the data processing apparatus dependent on the result of execution of that instruction.

18. A method as claimed in claim 17, wherein the indication generated at said step (d) comprises a phantom instruction routed through the second pipeline.

19. A method as claimed in claim 18, wherein the phantom instruction is routed into the second pipeline at the seine time as the instruction causing the phantom instruction to be generated is routed into the first pipeline.

20. A method as claimed in claim 19, wherein at said step (e) the second counter is incremented when the phantom instruction reaches the retirement stage of the second pipeline.

21. A method as claimed in claim 17, wherein at said step (c) the first counter is incremented upon said determination that the exception status of the instruction is resolved unless an exception was issued by the first pipeline when the exception status was resolved.

22. A method as claimed in claim 21, wherein at said step (f) it is determined that the instruction can be retired if the value of the second counter is not greater than the value of the first counter.

23. A method as claimed in claim 17, wherein at said step (c) the first counter is incremented when the instruction for which it has been determined that the exception status is resolved reaches the retirement stage of the first pipeline unless an exception was issued by the first pipeline when the exception status was resolved.

24. A method as claimed in claim 23, wherein at said step (f) it is determined that that instruction can be retired if the value of the second counter is not greater than the value of the first counter, thereby ensuring that instructions in the sequence are retired in order.

25. A method as claimed in claim 17, further comprising the step of maintaining a status field identifying when the first counter is to be incremented at said step (c), such that if the status field has a first value, the first counter is incremented upon said determination that the exception status of the instruction is resolved unless an exception was issued by the first pipeline when the exception status was resolved, whereas if the status field has a second value, the first counter is incremented when the instruction for which it has been determined that the exception status is resolved reaches the retirement stage of the first pipeline unless an exception was issued by the first pipeline when the exception status was resolved.

26. A method as claimed in claim 17, wherein at said step (f), if the value of the second counter exceeds the value of the first counter, the instruction is caused to be stalled in the retirement stage, unless in addition an exception was issued by the fast pipeline when the exception status was resolved, in which event any instructions in the second pipeline are caused to be discarded without those instructions being retired in the retirement stage of the second pipeline.

27. A method as claimed in claim 17, wherein said first and second counters are fixed size counters whose values wrap to a minimum value when a maximum value is exceeded.

28. A method as claimed in claim 17, wherein the first pipeline is a load/store pipeline operable to execute load or store instructions.

29. A method as claimed in claim 28, wherein said exception status is an abort status.

30. A method as claimed in claim 17, wherein the second pipeline is an arithmetic logic pipeline operable to execute data processing instructions.

31. A method as claimed in claim 30, wherein the state of the data processing apparatus to be updated when retiring an instruction at said step (g) comprises the contents of a set of registers accessible by the processor.

32. A method as claimed in claim 17, wherein the predetermined criteria used by the processor to determine into which pipeline to route an instruction in the sequence comprises instruction type.

33. A computer program product carrying a computer program operable to control a data processing apparatus to synchronise a first pipeline and a second pipeline of a processor in accordance with the method of claim 17.

* * * * *